(12) United States Patent
Frankowski et al.

(10) Patent No.: US 8,613,680 B2
(45) Date of Patent: Dec. 24, 2013

(54) TENSIONER WITH SPRING DAMPER

(75) Inventors: Marek Frankowski, Innisfil (CA); Liviu Tanjala, Woodbridge (CA); Jacek Stepniak, Innisfil (CA); Frank Schimpl, Toronto (CA)

(73) Assignee: Litens Automotive Partnership, Woodbridge (CA)

( * ) Notice: Subject to any disclaimer, the term of this patent is extended or adjusted under 35 U.S.C. 154(b) by 650 days.

(21) Appl. No.: 12/763,507

(22) Filed: Apr. 20, 2010

(65) Prior Publication Data

US 2011/0256969 A1 Oct. 20, 2011

(51) Int. Cl.
*F16H 7/12* (2006.01)

(52) U.S. Cl.
USPC .......................................... 474/135; 474/133

(58) Field of Classification Search
USPC .......................................... 474/112, 133, 135
See application file for complete search history.

(56) References Cited

U.S. PATENT DOCUMENTS

| | | | | |
|---|---|---|---|---|
| 3,528,533 A | * | 9/1970 | Sacchini | 192/41 S |
| 3,618,721 A | * | 11/1971 | Hare | 192/35 |
| 4,392,840 A | * | 7/1983 | Radocaj | 474/117 |
| 5,011,460 A | | 4/1991 | Ouchi et al. | 474/133 |
| 5,702,314 A | * | 12/1997 | Schmid | 474/94 |
| 6,102,820 A | * | 8/2000 | Imaharu et al. | 474/135 |
| 6,264,578 B1 | * | 7/2001 | Ayukawa | 474/135 |
| 6,468,172 B1 | * | 10/2002 | Lang et al. | 474/135 |
| 6,857,977 B1 | * | 2/2005 | Bertelshofer et al. | 474/117 |
| 2003/0098215 A1 | * | 5/2003 | Miller et al. | 192/41 S |
| 2006/0035740 A1 | * | 2/2006 | Lehtovaara et al. | 474/237 |
| 2008/0026894 A1 | * | 1/2008 | Dinca et al. | 474/112 |
| 2008/0139353 A1 | * | 6/2008 | Stepniak et al. | 474/112 |

FOREIGN PATENT DOCUMENTS

JP 2006170435 A1 6/2006

* cited by examiner

*Primary Examiner* — William A Rivera
*Assistant Examiner* — Henry Liu
(74) *Attorney, Agent, or Firm* — Harness, Dickey & Pierce, P.L.C.

(57) ABSTRACT

A tensioner having a closing-type torsion spring that is employed to bias a pivot arm about a pivot shaft. The tensioner includes a damper that continuously contacts an inside surface of the torsion spring to dampen torsional vibration transmitted through the torsion spring.

10 Claims, 8 Drawing Sheets

TENSIONER WITH SPRING DAMPER

INTRODUCTION

The present disclosure generally relates to a tensioner with a spring damper.

U.S. Pat. No. 7,507,172 discloses a tensioner that employs a friction brake. While such tensioners are satisfactory for their intended uses, we note that such tensioners are nonetheless susceptible to improvement.

SUMMARY

This section provides a general summary of the disclosure, and is not a comprehensive disclosure of its full scope or all of its features.

In one form, the present teachings provide a tensioner that includes a pivot shaft, a pivot arm, a torsion spring and a damper. The pivot arm is pivotally mounted on the pivot shaft. The torsion spring biases the pivot arm about the pivot shaft in a first rotational direction. The torsion spring is a closing-type torsion spring with a plurality of coils that are received about the pivot shaft. The damper is disposed in continuous contact with an inside surface of the coils of the torsion spring. The damper includes a resilient member that deflects radially inwardly in response to contact with the coils of the torsion spring.

In another form, the present teachings provide a tensioner having a pivot shaft, a pivot arm, a torsion spring, a stop sleeve, a first clamp sleeve, a wrap spring, a second clamp sleeve, at least one damper and a friction clamp. The pivot arm is pivotally mounted on the pivot shaft and defines a groove. The torsion spring biases the pivot arm about the pivot shaft in a first rotational direction. The torsion spring is a closing-type torsion spring with a plurality of coils that are received about the pivot shaft. The stop sleeve is received over the pivot shaft and within the torsion spring. The stop sleeve has a tongue that is received into the groove in the pivot arm. The tongue is smaller than the groove to permit a predetermined amount of movement of the pivot arm relative to the stop sleeve. The first clamp sleeve is mounted over the pivot shaft and is rotatably coupled to the stop sleeve. The wrap spring has a first end, which is fixedly coupled to the first clamp sleeve, and a plurality of helical coils that are disposed about the stop sleeve. The second clamp sleeve is mounted over the pivot shaft and abuts the first clamp sleeve on a side opposite the stop sleeve. The second clamp sleeve is non-rotatably coupled to the first clamp sleeve. The at least one damper is coupled to the second clamp sleeve and is configured to be in continuous contact with an inside surface of the coils of the torsion spring. The at least one damper is formed of a resilient material and deflects inwardly with increasing torque transmitted through the torsion spring. The friction clamp is housed between the first and second clamp sleeves and frictionally engaging the pivot shaft.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way. Similar or identical elements are given consistent identifying numerals throughout the various figures.

Corresponding reference numerals indicate corresponding parts throughout the several views of the drawings.

DETAILED DESCRIPTION OF THE VARIOUS EMBODIMENTS

Figure 1:
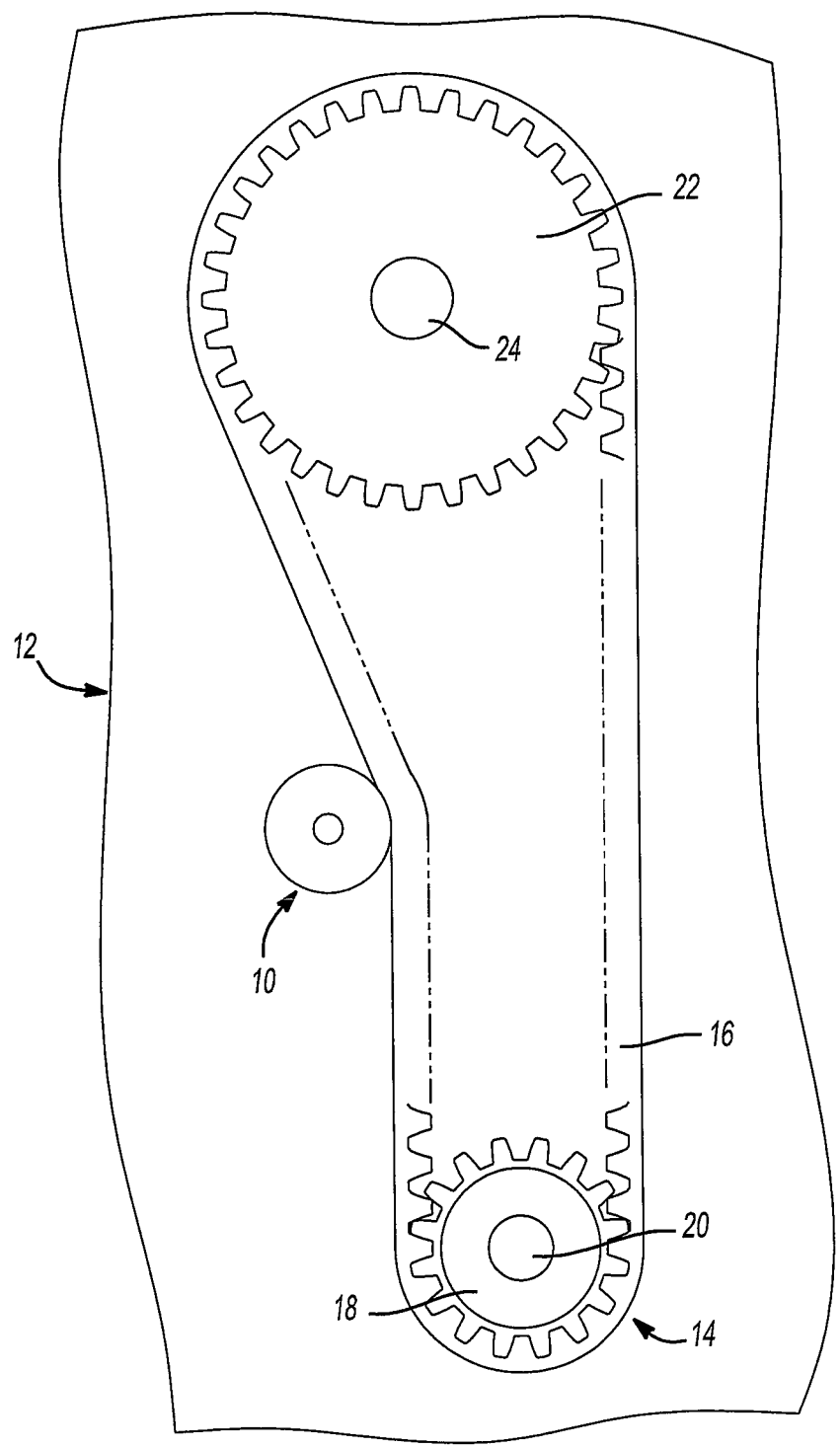
FIG. 1 is a schematic illustration of an exemplary tensioner constructed in accordance with the teachings of the present disclosure shown in operative association with the timing drive of an engine.

With reference to FIG. 1, a tensioner constructed in accordance with the teachings of the present disclosure is generally indicated by reference numeral 10 and operatively associated with an engine 12. The engine 12 can include a timing drive 14 in which an endless power transmitting element 16, such as a toothed belt, drivingly couples a driving sprocket 18, which can be coupled to a source of rotary power, such as a crankshaft 20, and a driven sprocket 22, which can be coupled to a driven device, such as a camshaft 24, and the tensioner 10 is employed to apply and maintain a tensioning force on the endless power transmitting element 16. Except as specifically noted herein, the tensioner 10 may be similar to the tensioner that is described in U.S. Pat. No. 7,507,172, the disclosure of which is hereby incorporated by reference as if fully set forth in detail herein.

Figure 2:
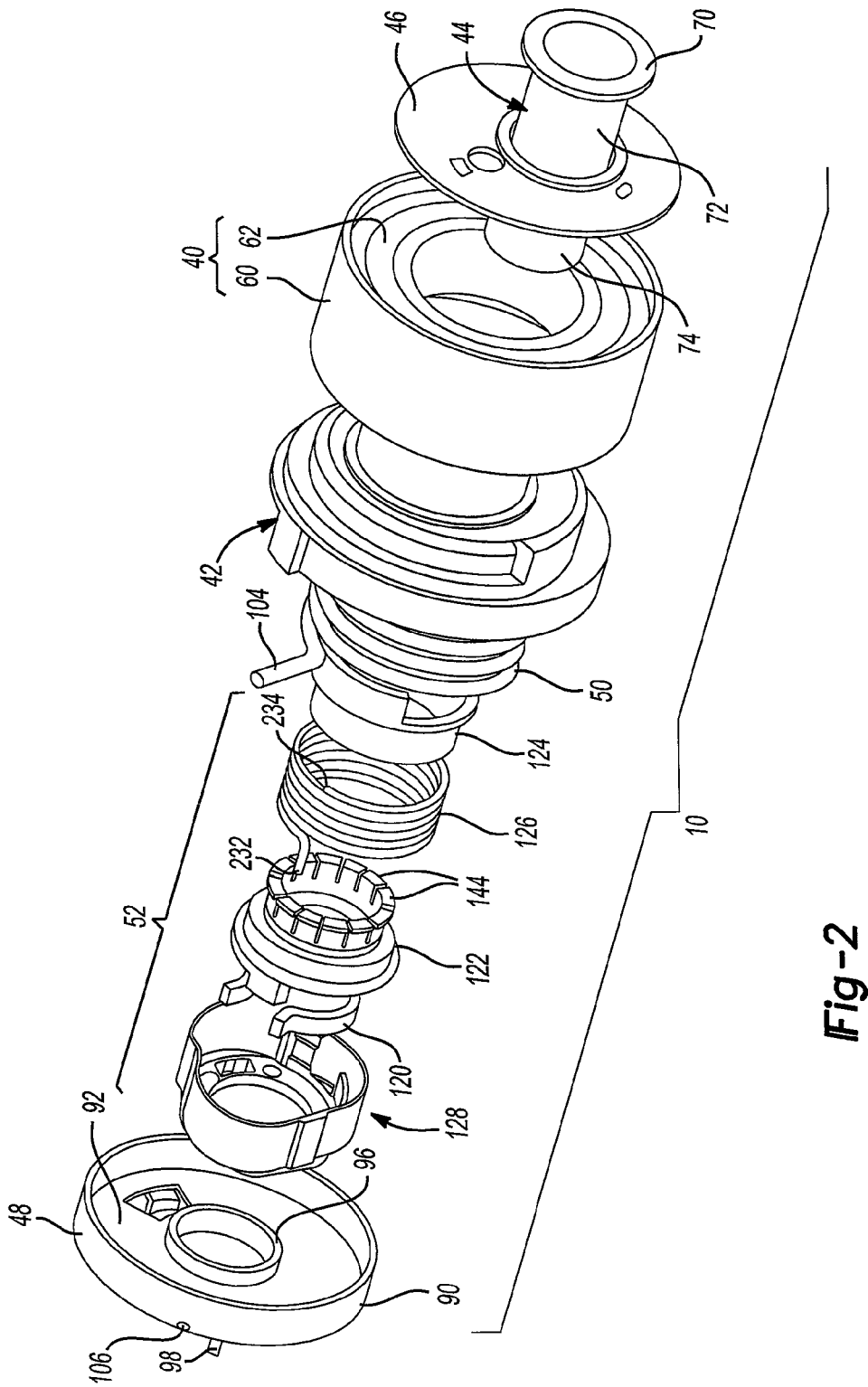
FIG. 2 is an exploded perspective view of the tensioner of FIG. 1.

With additional reference to FIG. 2, the tensioner 10 can include a pulley assembly 40, a pivot arm 42, a pivot shaft 44, a thrust washer 46, a base plate 48, a main spring 50, and a backstop device 52.

Figure 3:
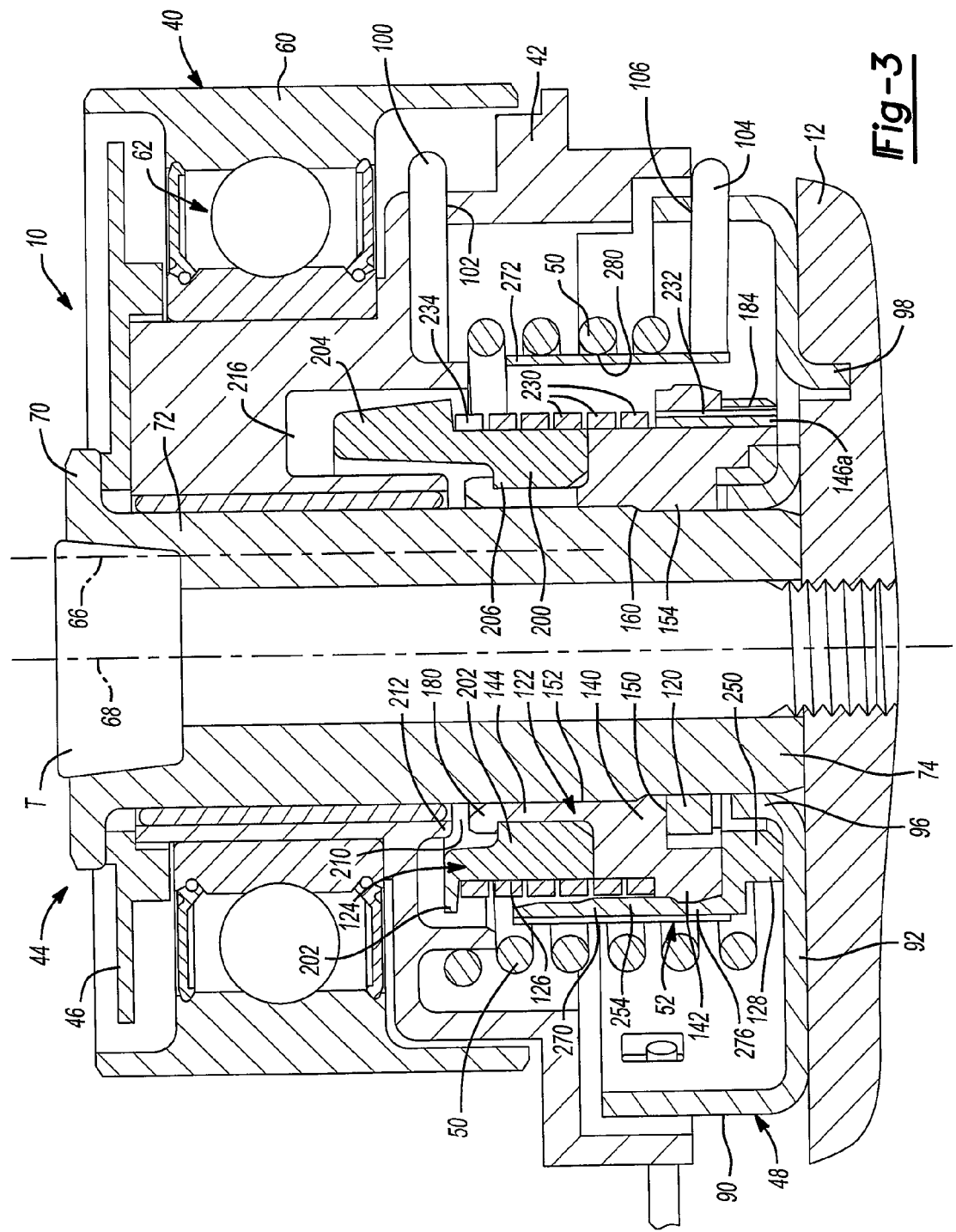
FIG. 3 is a section view of the tensioner of FIG. 1 taken longitudinally through the pivot shaft.

With reference to FIGS. 2 and 3, the pulley assembly 40 can include a pulley 60 and a bearing 62. In the particular example provided, the pulley 60 is configured to engage a rear, untoothed side of the endless power transmitting element 16 (FIG. 1), but it will be appreciated that pulley 60 could be configured with teeth or other features as desired, depending on the particular type of endless power transmitting element that is employed in the timing drive 14 (FIG. 1), as well as the particular side and/or location in which the pulley 60 engages the endless power transmitting element employed in the timing drive 14 (FIG. 1). The bearing 62 can be fixedly coupled to the pulley 60 and can be employed to support the pulley 60 for rotation on the pivot arm 42 about a first axis 66. In the particular example provided, the outer bearing race of the bearing 62 is integrally formed with the pulley 60.

The pivot shaft 44 can be employed to pivotally mount the pivot arm 42 to a structure of the engine 12, e.g., an engine block or cover, for rotation about a second axis 68 that can be parallel to but offset from the first axis 66. In this regard, the pivot shaft 44 can be generally hollow so as to receive a threaded fastener T that can fixedly couple the pivot shaft 44 to the engine 12. In the particular example provided, the pivot shaft 44 includes a head 70, a body portion 72 and a necked-down portion 74 that is coupled to an end of the body portion 72 opposite the head 70.

The thrust washer 46 can be mounted on the pivot shaft 44 between the head 70 and the pivot arm 42 and can be configured to control the friction between the pivot shaft 44 and the pivot arm 42 when the pivot arm 42 rotates relative to the pivot shaft 44. In the particular example provided, the thrust washer 46 is formed of nylon 4/6 with aramid fiber reinforcement. The thrust washer 46 can overlie the bearing 62 to shield the bearing 62 from dust, dirt and moisture.

The base plate 48 can comprise a container-like structure having an annular side wall 90 and a rear wall 92 that can be fixedly coupled to the pivot shaft 44. In the particular example provided, the base plate 48 comprises an inner collar 96 that is fixedly coupled in an appropriate manner, such as an interference fit, to the necked-down portion 74 of the pivot shaft 44. A locating member 98, such as a rearwardly extending tang, can be coupled to or formed on the base plate 48 and can be employed to orient the tensioner 10 in a predetermined orientation relative to the engine 12.

The main spring 50 can be disposed between the pivot arm 42 and the base plate 48 and can bias the pivot arm 42 in a predetermined first rotational direction relative to the base plate 48. The main spring 50 can be any type of torsion spring but in the particular example provided, the main spring 50 is a closing-type spring (i.e., a helical coil spring that coils more tightly with increasing torque) that is formed of round wire. The main spring 50 can include a first tang 100, which is received into an aperture 102 formed in the pivot arm 42, and a second tang 104 that is received into an aperture 106 formed in the base plate 48 (note that the first and second tangs 100 and 104 and the apertures 102 and 106 have been illustrated out of position in FIG. 3 for purposes of clarity). It should be appreciated, however, that the main spring 50 could be an opening-type spring and/or if desired, the main spring 50 could be formed of a square or rectangular wire.

The backstop device 52 can include a friction clamp 120, a first clamp sleeve 122, a stop sleeve 124, a clutch spring 126, and a second clamp sleeve 128.

Figure 5:
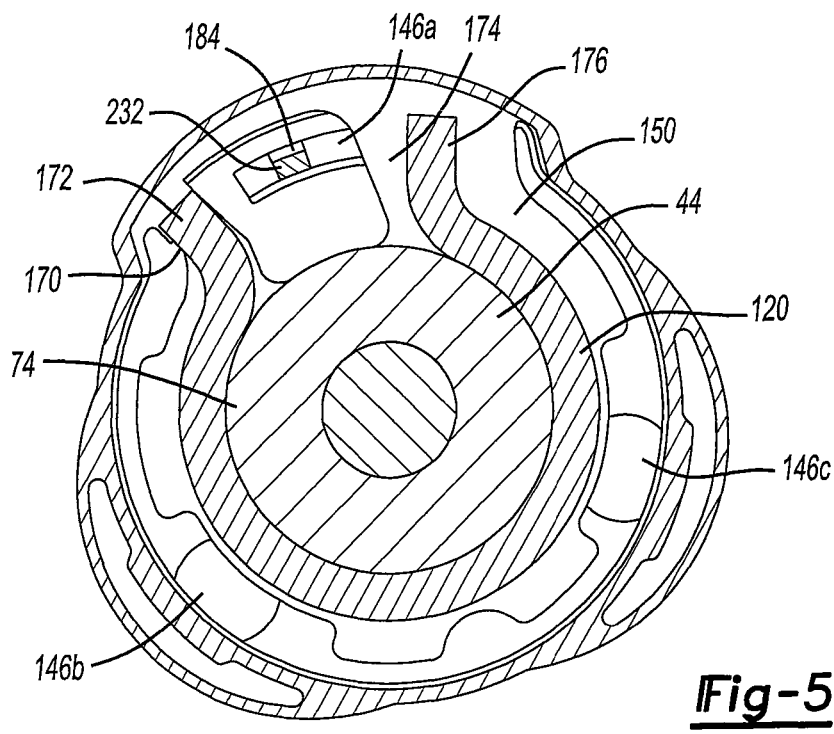
FIG. 5 is a bottom view of a portion of the backstop device, illustrating the first clamp sleeve in more detail.
Figure 6:
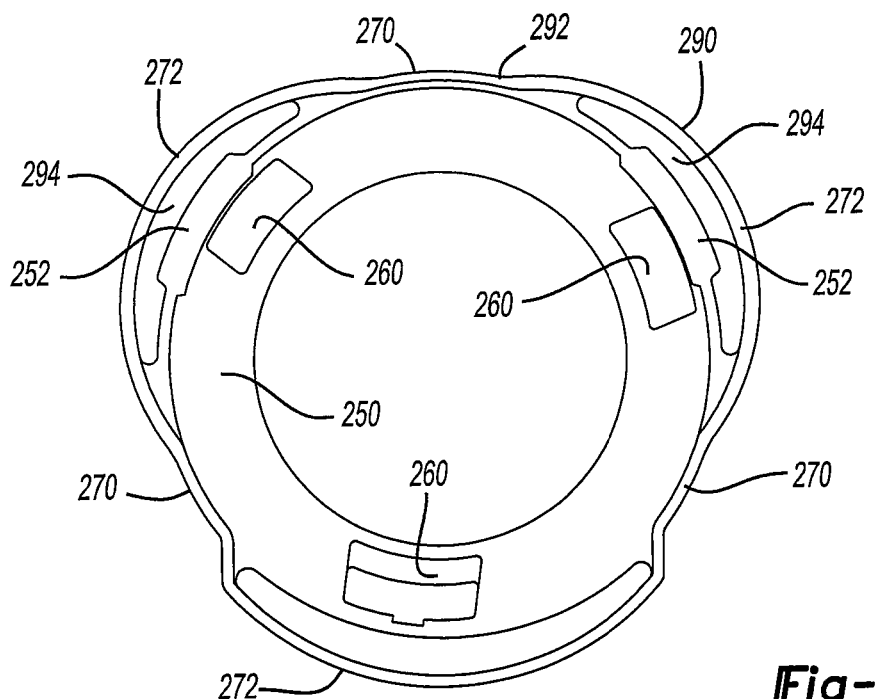
FIG. 6 is a top plan view of a portion of the backstop device illustrating the second clamp sleeve in more detail
Figure 7:
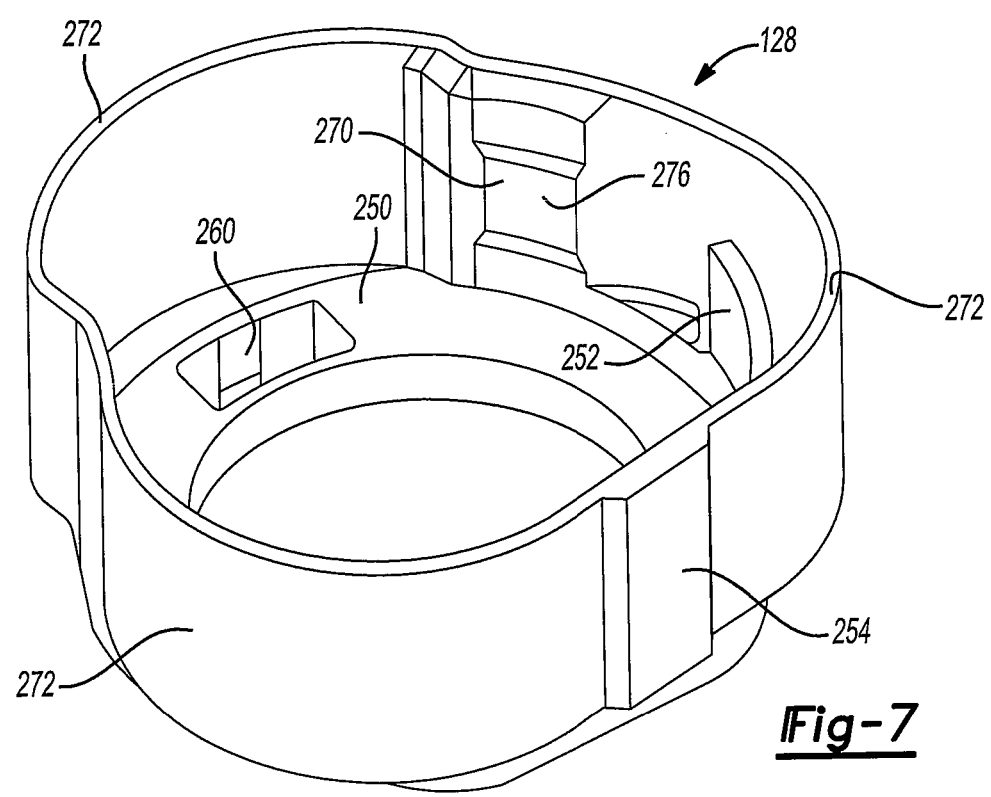
FIG. 7 is a perspective view of the second clamp sleeve.
Figure 8:
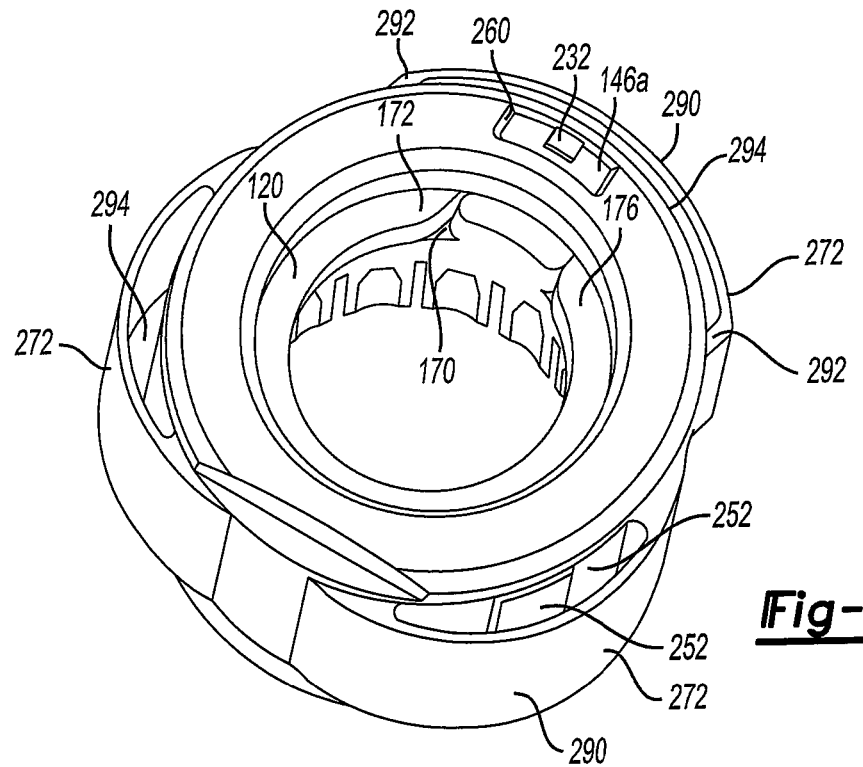
FIG. 8 is a bottom perspective view of the backstop device.

With reference to FIGS. 3 and 5, the friction clamp 120 can be configured similar to an external snap ring and can be configured to frictionally engage the pivot shaft 44. In the particular example provided, the friction clamp 120 is configured to make contact with a portion of the circumference of the necked-down portion 74 of the pivot shaft 44. The friction clamp 120 can be made of any appropriate material, such as an uncoated stainless steel spring wire having a square 3 mm by 3 mm cross-sectional area, but it will be appreciated that various other materials (including coatings) and material sizes may be employed to suit a particular application of the tensioner 10.

Figure 4:
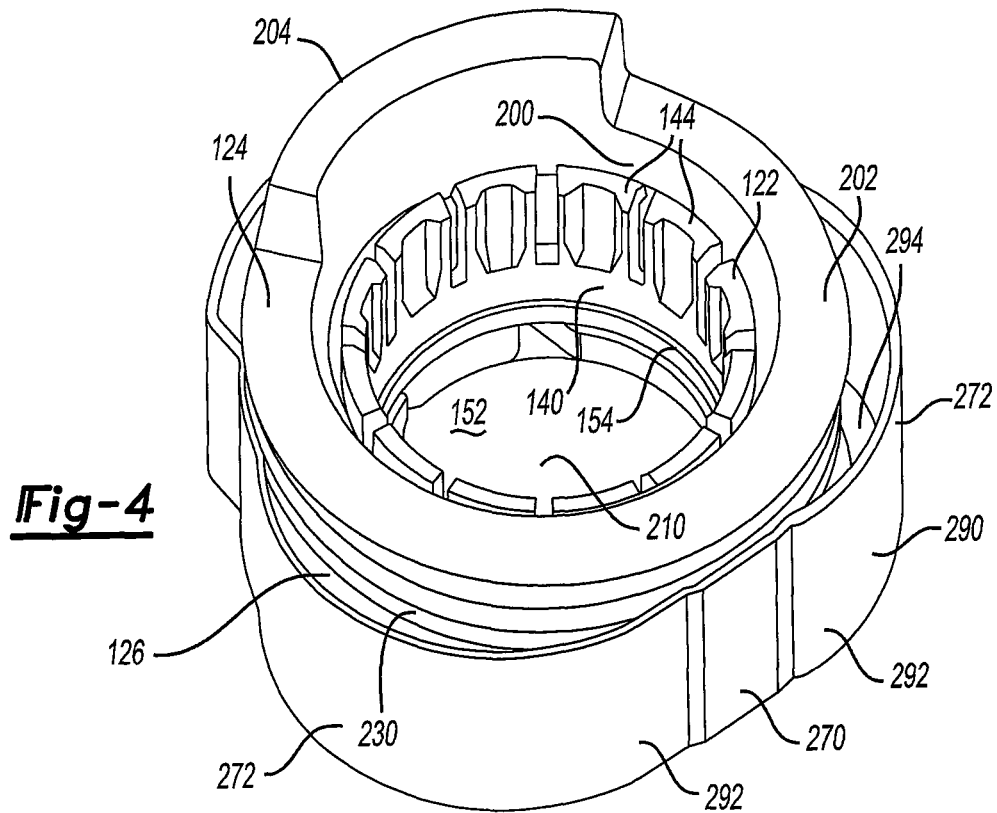
FIG. 4 is a top perspective view of a portion of the tensioner of FIG. 1, illustrating the backstop device in more detail.

With reference to FIGS. 3 through 5, the first clamp sleeve 122 can comprise an annular body 140, an annular peripheral wall 142, a plurality of flexural fingers 144, and a plurality of tenons 146a, 146b and 146c. The annular body 140 can define an abutting surface 150, a pivot shaft aperture 152 and an inwardly extending lip member 154. The abutting surface 150 can be configured to abut an upper side of the friction clamp 120. The pivot shaft aperture 152 can be configured to receive the body portion 72 of the pivot shaft 44, while the lip member 154 can be configured to abut a shoulder 160 on the pivot shaft 44 at the transition between the body portion 72 and the necked-down portion 74. The peripheral wall 142 can be contoured to envelope the outer perimeter of the friction clamp 120. In the example provided, the peripheral wall 142 defines a first end groove 170, which is configured to hold a first end 172 of the friction clamp 120, and a second end groove 174 which is configured to retain a second end 176 of the friction clamp 120. The first end groove 170 can be constructed in a narrow manner that inhibits relative rotation between the first end 172 of the friction clamp 120 and the first clamp sleeve 122, whereas the second end groove 174 can be constructed somewhat wider so as to permit relative rotation of the second end 176 of the friction clamp 120 in a manner that spreads the friction clamp 120. Also, the size of the second end groove 174 can be selected to compensate for the manufacturing variance in the friction clamp 120 (including the positioning of the first and second ends 172 and 176 of the friction clamp 120.) and in the diameter of the necked-down portion 74 of the pivot shaft 44. Construction in this manner permits the first and second ends 172 and 176 of the friction clamp 120 to be maintained in a predetermined position relative to one another or to further close the friction clamp 120 about the pivot shaft 44 to maintain or close the shape of the friction clamp 120 to thereby maintain or increase the friction force between the friction clamp 120 and the pivot shaft 44 when the first clamp sleeve 122 is rotated in the first rotational direction. It will be appreciated that the friction force applied by the friction clamp 120 is ordinarily sufficient to inhibit movement of the first clamp sleeve 122 about the pivot shaft in the first rotational direction. Configuration in this manner also permits the first and second ends 172 and 176 of the friction clamp 120 to be spread apart from one another (thereby opening the shape of the friction clamp 120 to decrease the friction force between the friction clamp 120 and the pivot shaft 44) when a torque in excess of a predetermined torque is applied to the first clamp sleeve 122 in a second rotational direction (opposite the first rotational direction). It will be appreciated that the friction force applied by the friction clamp 120 can prevent rotation of the first clamp sleeve 122 relative to the pivot shaft 44 when the torque applied to the first clamp sleeve 122 is less than or equal to the predetermined torque and that application of a torque exceeding the predetermined torque may be appropriate in instances where the pivot arm 42 is moved manually to replace an endless power transmitting element. The flexural fingers 144 can be coupled to and spaced circumferentially about the annular body 140 on a side opposite the peripheral wall 142. The flexural fingers 144 can extend axially from the annular body 140 so as to be cantilevered therefrom and can comprise a retaining tab 180 that is configured to engage the stop sleeve 124 as will be described in greater detail, below. The tenons 146a, 146b and 146c can extend axially from the peripheral wall 142. An axially extending hole 184 can be formed through a first one of the tenons 146a.

With reference to FIGS. 3 and 4, the stop sleeve 124 can include an annular sleeve body 200, a circumferentially extending external rim member 202, a tongue 204 and a circumferentially extending internal rim member 206. The sleeve body 200 can define an internal aperture 210 that can be sized to receive an annular shoulder 212 formed on the pivot arm 42, as well as the flexural fingers 144 of the first clamp sleeve 122. The external rim member 202 can be coupled to an upper end of the sleeve body 200 and can extend radially outwardly therefrom. The tongue 204 can extend axially upwardly from the external rim member 202 and can be configured to engage a tongue cavity 216 formed in the pivot arm 42. It will be appreciated that the tongue 204 can have a cross-section (taken perpendicular to the longitudinal axis of the pivot shaft 44) that can be shaped as a circular ring sector that is defined by a first included angle, and that the tongue cavity 216 can have a similar cross-sectional shape that is defined by a second included angle that is greater than the first included angle such that the pivot arm 42 can pivot to a limited extent about the pivot shaft 44 without contacting the stop sleeve 124 (so as not to effect operation of a clutch that is formed by the friction clamp 120, the first clamp sleeve 122, the stop sleeve 124 and the clutch spring 126). The internal rim member 206 is configured to be engaged by the retaining tab 180 of the flexural fingers 144 to inhibit separation of the stop sleeve 124 from the first clamp sleeve 122 in an axial direction.

With reference to FIGS. 3 through 5, the clutch spring 126 can be a wrap-type spring that can include a plurality of helical coils 230, a tang 232, which extends from a first side of the helical coils 230, and a free end 234 that is associated with a second, opposite end of the helical coils 230. The clutch spring 126 can be formed of any desired material, but in the particular example provided, is formed of a stainless spring steel wire having rectangular cross-section having a size of about 1 mm wide by 1.5 mm tall. The tang 232 can be turned at an angle of 90° from the helical coils 230. The clutch spring 126 can be received over the sleeve body 200 of the stop sleeve 124 such that the free end 234 abuts the external rim member 202. The helical coils 230 can be wound in a direction or sense that is opposite the direction or sense in which the main spring 50 is wound. The tang 232 can be received in the axially extending hole 184 in the tenon 146a of the first clamp sleeve 122. It will be appreciated that the tang 232 can be inserted into the axially extending hole 184 when the first clamp sleeve 122 is installed to the stop sleeve 124.

As assembled to the first clamp sleeve 122 and the clutch spring 126, the stop sleeve 124 is able to rotate about the flexural fingers 144 (and the pivot shaft 44) in the first rotational direction, but not in the second rotational direction due to the configuration of the clutch spring 126. More specifically, the clutch spring 126 tends to uncoil from the sleeve body 200 and thereby disengage the stop sleeve 124 when the stop sleeve 124 is subjected to a force that would tend to rotate the stop sleeve 124 in the first rotational direction, but tends to coil more tightly around the sleeve body 200 and thereby grippingly engage the stop sleeve 124 when the stop sleeve 124 is subjected to a force that would tend to rotate the stop sleeve 124 in the second rotational direction. Accordingly, it will be appreciated that the friction clamp 120, the stop sleeve 124, the first clamp sleeve 122 and the clutch spring 126 cooperate to form a one-way clutch that permits the stop sleeve 124 to rotate relative to the first clamp sleeve 122 in the first rotational direction, but inhibits rotation of the stop sleeve 124 relative to the first clamp sleeve 122 in the second rotational direction. It will be appreciated, however, that while the particular tensioner 10 has been described and illustrated with a one-way clutch, the teachings of the present disclosure have broader applicability and as such, the presence of a one-way clutch in a tensioner constructed in accordance with the present disclosure is entirely optional. For example, the friction clamp 120, the first clamp sleeve 122, the second clamp sleeve 124 and the clutch spring 126 could be eliminated in their entirety from the tensioner 10 if a one-way clutch is not desired.

With reference to FIGS. 3, and 6 through 8, the second clamp sleeve 128 can comprise an annular end wall 250, a plurality of spring limiters 252 and a side wall 254. The second clamp sleeve 128 can be unitarily formed (e.g., injection molded) from a suitable material, such as nylon 4/6 or nylon 4/6 with aramid fiber reinforcement. The second clamp sleeve 128 can be non-rotatably coupled to the first clamp sleeve 122, and the friction clamp 120 can be received into the interior of the second clamp sleeve 128.

The end wall 250 can be abutted against an interior surface of the rear wall 92 of the base plate 48 and can be disposed over the necked-down portion 74 of the pivot shaft 44. An opposite axial side of the end wall 250 can abut the friction clamp 120 on a side opposite the abutting surface 150. A plurality of apertures 260 can be formed into the end wall 250 to receive the tenons 146a, 146b and 146c to thereby couple the first clamp sleeve 122 to the second clamp sleeve 128.

The spring limiters 252 can be coupled to the end wall 250 and spaced circumferentially about the end wall 250 at a predetermined distance from the clutch spring 126 and can be configured to limit radial outward expansion of the clutch spring 126 to a predetermined dimension. In the particular example provided, two spring limiters 252 are employed, with each spring limiter being aligned radially with an associated one of the tenons 146b and 146c. It will be appreciated, however, that more or fewer spring limiters 252 could be employed and that their location about the end wall 250 could be different from that which is described and illustrated herein.

The side wall 254 can be coupled to the annular end wall 250 and can define a plurality of retaining members 270 and a plurality of damping members 272. The retaining members 270 can be coupled to and extend from the end wall 250 and can define a set of projections 276 that can engage the annular body 140 of the first clamp sleeve 122 in a snap-fit manner that retains the first clamp sleeve 122 to the second clamp sleeve 128.

Figure 9:
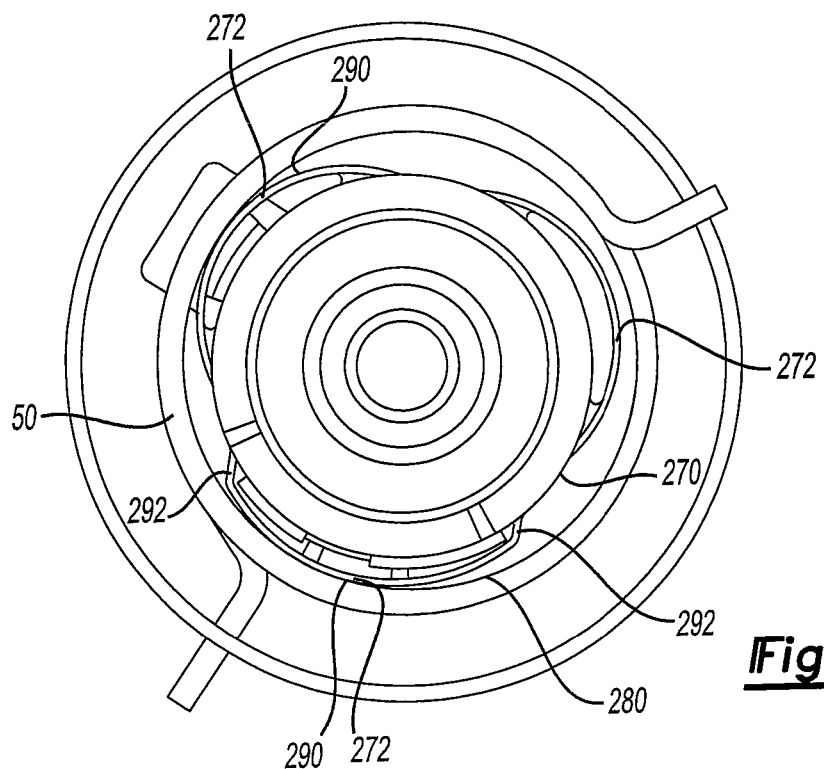
FIG. 9 is a partly sectioned view of the tensioner of FIG. 1 illustrating the main spring contacting the damping members.

With reference to FIGS. 3, 4 and 9, the damping members 272 can be coupled to the retaining members 270 and can be configured such that at least one of the damping members 272 contacts the inside surface 280 of the main spring 50 at all times to dampen vibration that is transmitted through the main spring 50. The degree of contact between the damping members 272 and the main spring 50 can be dictated by the degree to which vibration in the main spring 50 is to be damped. In the particular example provided, each of the damping members 272 comprises an annular sector 290 that is coupled on opposite ends to an adjacent pair of the retaining members 270 via a pair of end members 292 such that a circumferentially extending space 294 is disposed between the end wall 250 and the annular sector 290. The annular sector 290 can be lobed, rather than circular, such that it is furthest away from a longitudinal axis of the second clamp sleeve 128 at its mid-point.

Returning to FIGS. 3 and 9, the pivot arm 42 can rotate about the pivot shaft 44 during operation of the tensioner 10 to maintain a desired level of tension in the endless power transmitting element 16 (FIG. 1). Movement of the pivot arm 42 can cause a corresponding coiling or uncoiling of the main spring 50. In some instances, the movement of the pivot arm 42 might tend to cause the main spring 50 to vibrate at a resonant frequency. The annular sectors 290 can deflect in response to contact with the main spring 50; the friction associated with this contact, as well as the energy required to deflect the annular sectors 290, can help attenuate vibration and prevent the main spring 50 from entering resonance.

Figure 10:
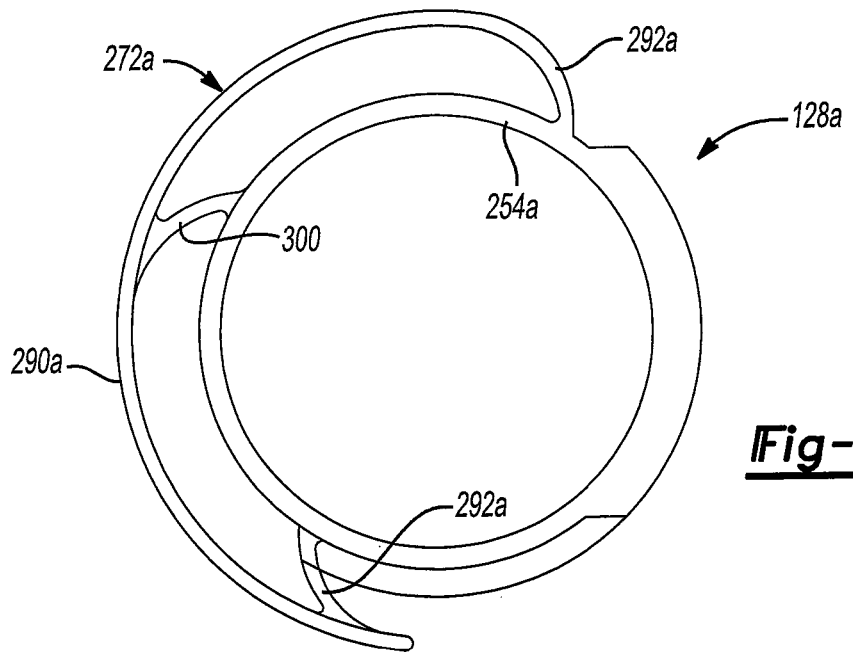
FIG. 10 is a bottom view of another second clamp sleeve constructed in accordance with the teachings of the present disclosure.

With reference to FIGS. 10 through 13, other second clamp sleeves constructed in accordance with the teachings of the present disclosure. In FIG. 10, the second clamp sleeve 128a comprises an annular side wall 254a and a single damping member 272a having an annular sector 290a that is coupled to the side wall 254a by a pair of end members 292a and an intermediate member 300.

Figure 11:
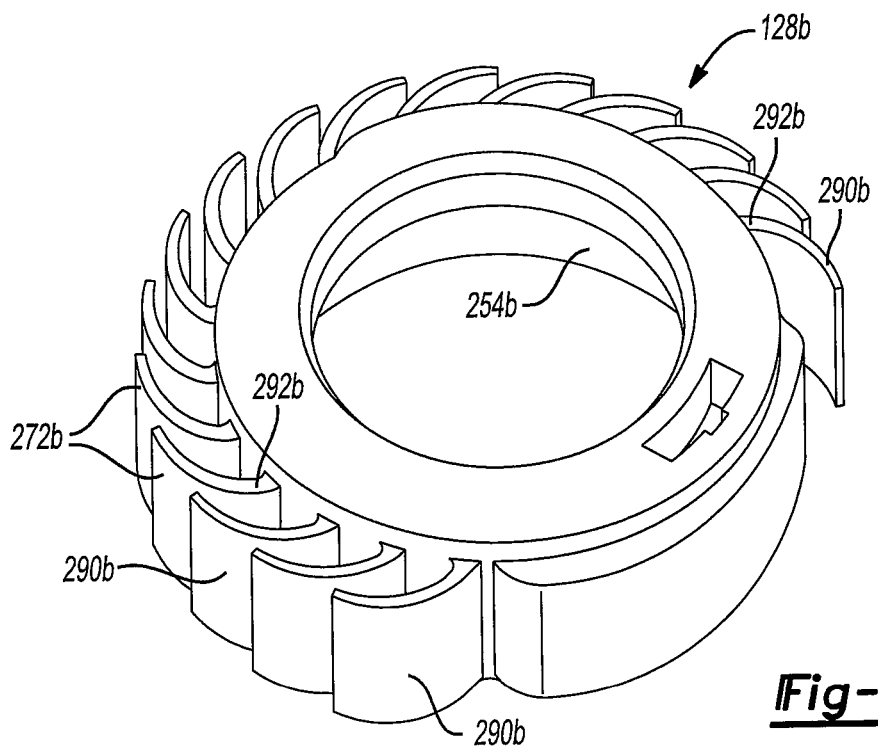
FIGS. 11 through 13 are perspective views of other second clamp sleeves constructed in accordance with the teachings of the present disclosure.
Figure 12:
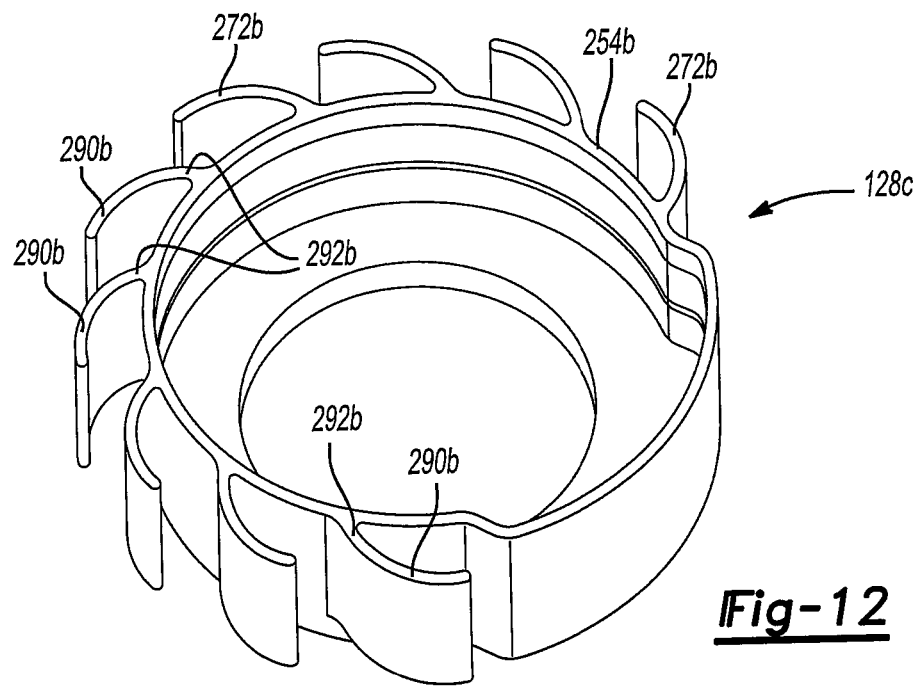
Figure 13:
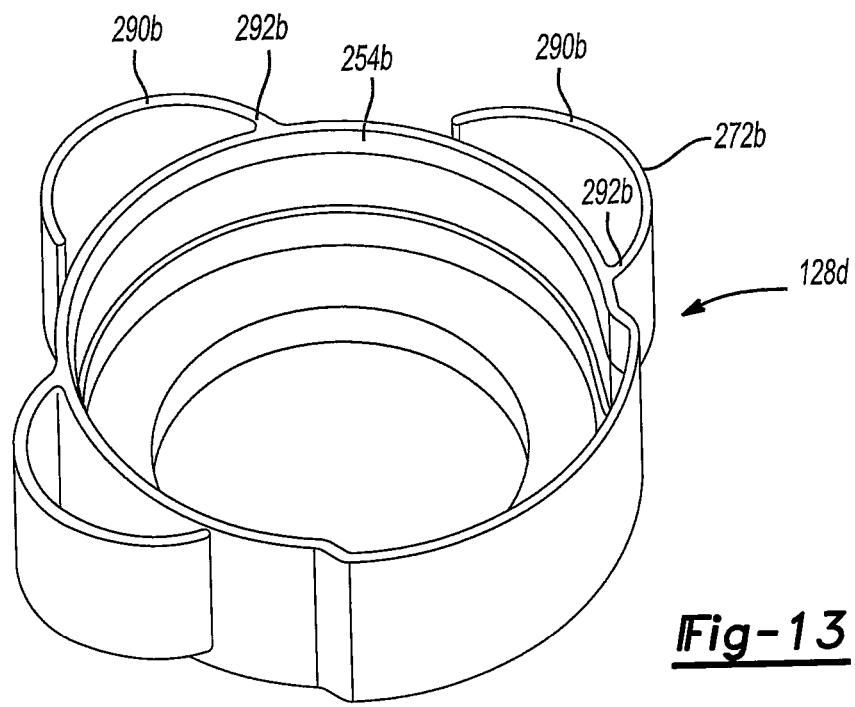

In FIGS. 11 through 13, each of the second clamp sleeves 128b, 128c and 128d comprises an annular side wall 254b and a plurality of damping members 272b that are coupled to and extend radially outwardly from the side wall 254b. In the particular examples provided, the damping members 272b comprise a single arcuate sector 290b that is coupled to the side wall 254b via a single end member 292b.

Accordingly, it will be appreciated that the damping members could be shaped in any appropriate manner. In this regard, the damping members need not be arcuate or be unitarily formed with the remainder of the second clamp sleeve, but could comprise one or more components that can be assembled to or molded onto the remainder of the second clamp sleeve. For example, the spaces 294a defined by the annular sector 290a, the side wall 254a, the end members 292a and the intermediate wall 300 in Figure—could be filled with a resilient material, e.g., via overmolding, that can further stiffen the damping member 272a where a relatively higher degree of damping is required. It will also be appreciated that the damping member (or a material that is employed to stiffen the damping member) could be configured with multiple spring rates to provide additional levels of damping. For example, the second clamp sleeves 128b, 128c and 128d could be configured such that a first portion of the damping members 272b have a first cross-sectional area (and therefore a first spring rate) while a second portion of the damping members 272b could have a second, larger cross-sectional area (and therefore a second spring rate). If multiple spring rates are employed, the damping member can be configured to provide a first spring rate when the main spring 50 deflects the damping member by an amount that is less than or equal to a predetermined amount and a second spring rate when the damping member is deflected by an amount that is greater than the predetermined amount.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims.

What is claimed is:

1. A tensioner comprising:
a pivot shaft;
a pivot arm pivotally mounted on the pivot shaft and defining a groove;
a torsion spring that biases the pivot arm about the pivot shaft in a first rotational direction, the torsion spring being a closing-type torsion spring with a plurality of coils that are received about the pivot shaft;
a stop sleeve received over the pivot shaft and within the torsion spring, the stop sleeve having a tongue that is received into the groove in the pivot arm, the tongue being smaller than the groove to permit a predetermined amount of movement of the pivot arm relative to the stop sleeve;
a first clamp sleeve mounted over the pivot shaft and rotatably coupled to the stop sleeve;
a wrap spring having a first end, which is fixedly coupled to the first clamp sleeve, and a plurality of helical coils that are disposed about the stop sleeve;
a second clamp sleeve mounted over the pivot shaft and abutting the first clamp sleeve on a side opposite the stop sleeve, the second clamp sleeve being non-rotatably coupled to the first clamp sleeve;
at least one damper coupled to the second clamp sleeve and configured to be in continuous contact with an inside surface of the coils of the torsion spring, the at least one damper being formed of a resilient material and deflecting inwardly with increasing torque transmitted through the torsion spring; and
a friction clamp housed between the first and second clamp sleeves, the friction clamp frictionally engaging the pivot shaft;
wherein the at least one damper comprises a first end member and a damping member, the first end member being fixed to the second clamp sleeve, the damping member being coupled to the first end member at a first lateral side and extending laterally away from the first end member in a circumferential direction such that a radial space is defined between the damping member and the second clamp sleeve.

2. The tensioner of claim 1, wherein the first clamp sleeve is configured to maintain the friction clamp in a closed position around the pivot shaft when the pivot arm is moved in the first rotational direction and wherein the first clamp sleeve is configured to permit the friction clamp to spread open when a torque in excess of a predetermined torque is applied to the pivot arm in a second rotational direction opposite the first rotational direction.

3. The tensioner of claim 1, wherein the at least one damper comprises a plurality of lobes that are disposed about the second clamp sleeve.

4. The tensioner of claim 3, wherein each of the lobes is supported on its opposite sides by a wall member.

5. The tensioner of claim 1, wherein the at least one damper comprises an annular wall and a plurality of damper members that extend radially outwardly from the annular wall.

6. The tensioner of claim 5, wherein each damper member is coupled to the annular wall by a single wall member.

7. The tensioner of claim 1, wherein the stop sleeve and the second clamp sleeve are snap-fit to the first clamp sleeve.

8. A tensioner comprising:
a pivot shaft;
a pivot arm pivotally mounted on the pivot shaft and defining a groove;
a torsion spring that biases the pivot arm about the pivot shaft in a first rotational direction, the torsion spring being a closing-type torsion spring with a plurality of coils that are received about the pivot shaft;

a pulley mounted on the pivot arm at a location that is offset from the pivot shaft;

a stop sleeve received over the pivot shaft and within the torsion spring, the stop sleeve having a tongue that is received into the groove in the pivot arm, the tongue being smaller than the groove to permit a predetermined amount of movement of the pivot arm relative to the stop sleeve;

a first clamp sleeve mounted over the pivot shaft and rotatably coupled to the stop sleeve;

a wrap spring having a first end, which is fixedly coupled to the first clamp sleeve, and a plurality of helical coils that are disposed about the stop sleeve;

a second clamp sleeve mounted over the pivot shaft and abutting the first clamp sleeve on a side opposite the stop sleeve, the second clamp sleeve being non-rotatably coupled to the first clamp sleeve;

at least one damper coupled to the second clamp sleeve and configured to be in continuous contact with an inside surface of the coils of the torsion spring, the at least one damper being formed of a resilient material and deflecting inwardly with increasing torque transmitted through the torsion spring; and a friction clamp housed between the first and second clamp sleeves, the friction clamp frictionally engaging the pivot shaft;

wherein the first clamp sleeve is configured to maintain the friction clamp in a closed position around the pivot shaft when the pivot arm is moved in the first rotational direction and wherein the first clamp sleeve is configured to permit the friction clamp to spread open when a torque in excess of a predetermined torque is applied to the pivot arm in a second rotational direction opposite the first rotational direction;

wherein the at least one damper comprises a first end member and a damping member, the first end member being fixed to the second clamp sleeve, the damping member being coupled to the first end member at a first lateral side and extending laterally away from the first end member in a circumferential direction such that a radial space is defined between the damping member and the second clamp sleeve;

wherein the at least one damper comprises a plurality of lobes that are disposed about the second clamp sleeve;

wherein each of the lobes is supported on its opposite sides by a wall member; and wherein the stop sleeve and the second clamp sleeve are snap-fit to the first clamp sleeve.

9. The tensioner of claim 1, wherein the damping member is coupled to a second end member opposite the first end member, the second end member being fixed to the second clamp sleeve.

10. The tensioner of claim 8, wherein the damping member is coupled to a second end member opposite the first end member, the second end member being fixed to the second clamp sleeve.

* * * * *